US011595834B2

(12) United States Patent
Koziol et al.

(10) Patent No.: US 11,595,834 B2
(45) Date of Patent: Feb. 28, 2023

(54) AUTOMATIC NEIGHBOR RELATION ENHANCEMENTS FOR DUAL CONNECTIVITY

(71) Applicant: Nokia Technologies Oy, Espoo (FI)

(72) Inventors: Dawid Koziol, Wroclaw (PL); Jing He, Beijing (CN); Hakon Helmers, Sceaux (FR); Amaanat Ali, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/057,404

(22) PCT Filed: Jun. 20, 2018

(86) PCT No.: PCT/CN2018/092044
§ 371 (c)(1),
(2) Date: Nov. 20, 2020

(87) PCT Pub. No.: WO2019/241939
PCT Pub. Date: Dec. 26, 2019

(65) Prior Publication Data
US 2021/0211899 A1    Jul. 8, 2021

(51) Int. Cl.
*H04W 24/02*        (2009.01)
*H04W 24/10*        (2009.01)

(52) U.S. Cl.
CPC ........... *H04W 24/02* (2013.01); *H04W 24/10* (2013.01)

(58) Field of Classification Search
CPC . H04W 24/02; H04W 24/10; H04W 36/0061; H04W 36/00835; H04W 76/15
See application file for complete search history.

(56) References Cited

U.S. PATENT DOCUMENTS

2014/0080484 A1    3/2014  Centonza et al.
2015/0271714 A1*   9/2015  Shetigar ............ H04W 36/0061
                                                    370/255
(Continued)

FOREIGN PATENT DOCUMENTS

CN    104054372 A    9/2014
CN    105228171 A    1/2016
(Continued)

OTHER PUBLICATIONS

Office Action received for corresponding Taiwan Patent Application No. 108118228, dated Sep. 8, 2021, 7 pages of Office Action and no page of Translation available.
(Continued)

*Primary Examiner* — Jae Y Lee
(74) *Attorney, Agent, or Firm* — Squire Patton Boggs (US) LLP

(57) ABSTRACT

In accordance with an embodiment, an apparatus may include at least one processor and at least one memory including computer program code. The at least one memory and the computer program code can be configured to, with the at least one processor, cause the apparatus to at least transmit a request for one or more cell global identities associated with one or more cells to a network entity. The at least one memory and the computer program code can be further configured to, with the at least one processor, cause the apparatus to at least update one or more neighbor relation tables based upon the received automatic neighbor relation related information. The at least one memory and the computer program code can be further configured to, with the at least one processor, cause the apparatus to at least transmit information based upon the updated one or more neighbor relation tables.

14 Claims, 5 Drawing Sheets

(56) References Cited

U.S. PATENT DOCUMENTS

| | | | |
|---|---|---|---|
| 2017/0359737 A1* | 12/2017 | Singh | H04W 36/0061 |
| 2017/0366985 A1 | 12/2017 | Chiba et al. | |
| 2020/0029275 A1* | 1/2020 | Mackenzie | H04W 52/0206 |
| 2021/0120481 A1* | 4/2021 | Cheng | H04W 36/0058 |

FOREIGN PATENT DOCUMENTS

| | | |
|---|---|---|
| KR | 10-2013-0028745 A | 3/2013 |
| WO | 2011/139855 A1 | 11/2011 |
| WO | 2011/139857 A1 | 11/2011 |
| WO | 2016/082940 A1 | 6/2016 |
| WO | 2017/218215 A1 | 12/2017 |

OTHER PUBLICATIONS

Extended European Search Report received for corresponding European Patent Application No. 18923526.0, dated Dec. 22, 2021, 10 pages.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300, V15.1.0, Mar. 2018, pp. 1-341.
"3rd Generation Partnership Project; Technical Specification Group Radio Access Network; NR; Base Station (BS) radio transmission and reception (Release 15)", 3GPP TS 38.104, V15.1.0, Mar. 2018, pp. 1-133.
"3rd Generation Partnership Project; Technical Specification Group Radio Access Network; Evolved Universal Terrestrial Radio Access (E-UTRA); Base Station (BS) radio transmission and reception (Release 15)", 3GPP TS 36.104, V15.2.0, Mar. 2018, pp. 1-279.
International Search Report and Written Opinion received for corresponding Patent Cooperation Treaty Application No. PCT/CN2018/092044, dated Feb. 27, 2019, 9 pages.
"Impact on the Neighbour Relation Table from the Frequency Sharing feature", 3GPP TSG-RAN WG3 Meeting #99, R3-181189, Agenda : 10.14.1, Nokia, Feb. 26-Mar. 2, 2018, 2 pages.
Tentative Rejection received for corresponding Taiwan Patent Application No. 108118228, dated Jun. 2, 2020, 8 pages of Tentative Rejection and 3 pages of Translation available.
Office Action received for corresponding Indian Patent Application No. 202147000597, dated Jan. 24, 2022, 6 pages.
Korean Office Action corresponding to KR Application No. 10-2021-7001796, dated Mar. 30, 2022.
Taiwanese Office Action corresponding to TW Application No. 108118228, dated Oct. 18, 2022.
Indonesian Office Action corrsponding to ID Application No. P00202008159, dated Oct. 29, 2022.

* cited by examiner

AUTOMATIC NEIGHBOR RELATION ENHANCEMENTS FOR DUAL CONNECTIVITY

RELATED APPLICATION

This application was originally filed as PCT Application No. PCT/CN2018/092044 on Jun. 20, 2018, each of which is incorporated herein by reference in its entirety.

BACKGROUND

Field

Certain embodiments may relate to communication systems. For example, some embodiments may relate to neighbor cell relations.

Description of the Related Art

Automatic neighbor relation (ANR) functions relieve a wireless network operator from the burdens of manually managing neighbor cell relation (NCR) lists. NCR lists provide a mapping between a cell global identity (CGI) and a physical cell identity (PCI) and its associated frequencies. CGIs are also created for each cell within a network entity, such as an evolved Node B (eNB) or next generation Node B (gNB). CGIs may also be associated with additional parameters to characterize the relationship or define certain behavior of specific neighbor relationships, for example, restrictions on handover or removal functions. Reported CGIs may be used to create neighbor relationships for cells associated with a physical cell identifier (PCI), which may be reported by user equipment to a network entity that is missing an entry in a neighbor relation table (NRT), as illustrated in FIG. 1. The network entity may configure a dedicated report type, such as a reportCGI, and indicate the PCI and frequency of the cell for which the CGI is to be read by the user equipment. In response, user equipment may read parameters of the indicated cell, such as a system information block (SIB) 1, acquire information such as CGIs, public land mobile network identifiers (PLMNIDs), tracking area code (TAC), and radio access network area code (RANAC). Finally, the user equipment may provide this information to the serving network entity through a measurement report. However, when user equipment is operating in a dual connectivity (DC) mode, such as NR-DC, EUTRA-NR-DC (EN-DC), and NR-EUTRA-DC (NE-DC), the user equipment can be configured with only a single reportCGI configuration at a time, from either a master node or a secondary node. Thus, coordination between a master node and a secondary node is desirable.

SUMMARY

In accordance with an embodiment, a method may include transmitting, by a first network entity, a request for one or more cell global identities associated with one or more cells to a second network entity. The method may further include receiving, by the first network entity, automatic neighbor relation related information associated with the one or more cells. The method may further include updating, by the first network entity, one or more neighbor relation tables based upon the received automatic neighbor relation related information.

In accordance with an embodiment, an apparatus may include at least one processor and at least one memory including computer program code. The at least one memory and the computer program code can be configured to, with the at least one processor, cause the apparatus to at least transmit a request for one or more cell global identities associated with one or more cells to a network entity. The at least one memory and the computer program code can be further configured to, with the at least one processor, cause the apparatus to at least receive automatic neighbor relation related information associated with the one or more cells. The at least one memory and the computer program code can be further configured to, with the at least one processor, cause the apparatus to at least update one or more neighbor relation tables based upon the received automatic neighbor relation related information.

In accordance with an embodiment, an apparatus may include means for transmitting a request for one or more cell global identities associated with one or more cells to a network entity. The apparatus may further include means for receiving automatic neighbor relation related information associated with the one or more cells. The apparatus may further include means for updating one or more neighbor relation tables based upon the received automatic neighbor relation related information.

In accordance with an embodiment, a non-transitory computer readable medium can, in certain embodiments, be encoded with instructions that may, when executed in hardware, perform a process. The process may include a method that may transmit a request for one or more cell global identities associated with one or more cells to a network entity. The process may include a method that may further receive automatic neighbor relation related information associated with the one or more cells. The process may include a method that may further update one or more neighbor relation tables based upon the received automatic neighbor relation related information.

In accordance with an embodiment, a computer program product may, according to certain embodiments, have instructions encoded for performing a process. The process may include a method that may transmit a request for one or more cell global identities associated with one or more cells to a network entity. The process may include a method that may further receive automatic neighbor relation related information associated with the one or more cells. The process may include a method that may further update one or more neighbor relation tables based upon the received automatic neighbor relation related information.

In accordance with an embodiment, an apparatus may include circuitry configured to transmit a request for one or more cell global identities associated with one or more cells to a network entity. The apparatus may further include circuitry configured to receive automatic neighbor relation related information associated with the one or more cells. The apparatus may further include circuitry configured to update one or more neighbor relation tables based upon the received automatic neighbor relation related information.

In accordance with an embodiment, a method may include receiving, by a first network entity, a request for one or more cell global identities associated with one or more cells from a second network entity. The method may further include updating, by the first network entity, one or more neighbor relation tables with additional neighbor relations. The method may further include transmitting, by the first network entity, automatic neighbor relation related information associated with the one or more cells to the second network entity.

In accordance with an embodiment, an apparatus may include at least one processor and at least one memory including computer program code. The at least one memory and the computer program code can be configured to, with the at least one processor, cause the apparatus to at least include receive a request for one or more cell global identities associated with one or more cells from a network entity. The at least one memory and the computer program code can be further configured to, with the at least one processor, cause the apparatus to at least update one or more neighbor relation tables with additional neighbor relations. The at least one memory and the computer program code can be further configured to, with the at least one processor, cause the apparatus to at least transmit automatic neighbor relation related information associated with the one or more cells to the second network entity.

In accordance with an embodiment, an apparatus may include means for receiving a request for one or more cell global identities associated with one or more cells from a network entity. The apparatus may further include means for updating one or more neighbor relation tables with additional neighbor relations. The apparatus may further include means for transmitting automatic neighbor relation related information associated with the one or more cells to the second network entity.

In accordance with an embodiment, a non-transitory computer readable medium can, in certain embodiments, be encoded with instructions that may, when executed in hardware, perform a process. The process may include a method that may receive a request for one or more cell global identities associated with one or more cells from a network entity. The process may include a method that may further update one or more neighbor relation tables with additional neighbor relations. The process may include a method that may further transmit automatic neighbor relation related information associated with the one or more cells to the second network entity.

In accordance with an embodiment, a computer program product may, according to certain embodiments, have instructions encoded for performing a process. The process may include a method that may receive a request for one or more cell global identities associated with one or more cells from a network entity. The process may include a method that may further update one or more neighbor relation tables with additional neighbor relations. The process may include a method that may further transmit automatic neighbor relation related information associated with the one or more cells to the second network entity.

In accordance with an embodiment, an apparatus may include circuitry configured to receive a request for one or more cell global identities associated with one or more cells from a network entity. The apparatus may further include circuitry configured to update one or more neighbor relation tables with additional neighbor relations. The apparatus may further include circuitry configured to transmit automatic neighbor relation related information associated with the one or more cells to the second network entity.

BRIEF DESCRIPTION OF THE DRAWINGS

For proper understanding of this disclosure, reference should be made to the accompanying drawings, wherein.

DETAILED DESCRIPTION

Certain embodiments described herein may help to improve coordination between a master node and a secondary node. The example embodiments described herein may have various benefits and/or advantages. For example, some embodiments may provide automatic coordination between a master node and a secondary node since only the master node is capable of configuring report cell global identities, with no additional coordination required. Certain embodiments may also ensure that user equipment is configured with a single cell global identity procedure at a time. Furthermore, both a master node and a secondary node may use the information reported by user equipment during a reportCGI procedure. Certain embodiments are, therefore, directed to improvements in computer-related technology, specifically, by conserving network resources and reducing power consumption of network entities and/or user equipment located within the network.

Figure 1:
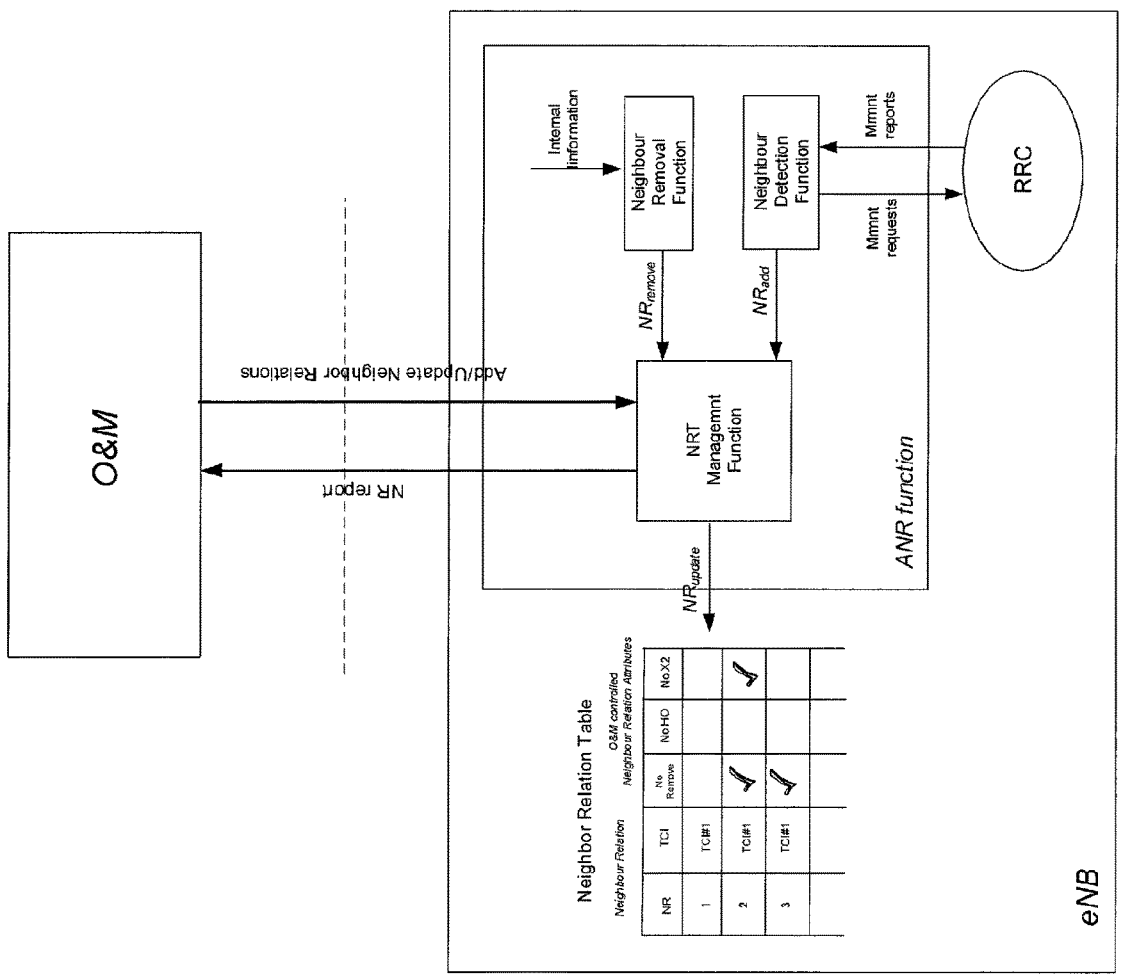
FIG. 1 illustrates interaction between an evolved Node B and an operations and management entity due to automatic neighbor relationships.
Figure 2:
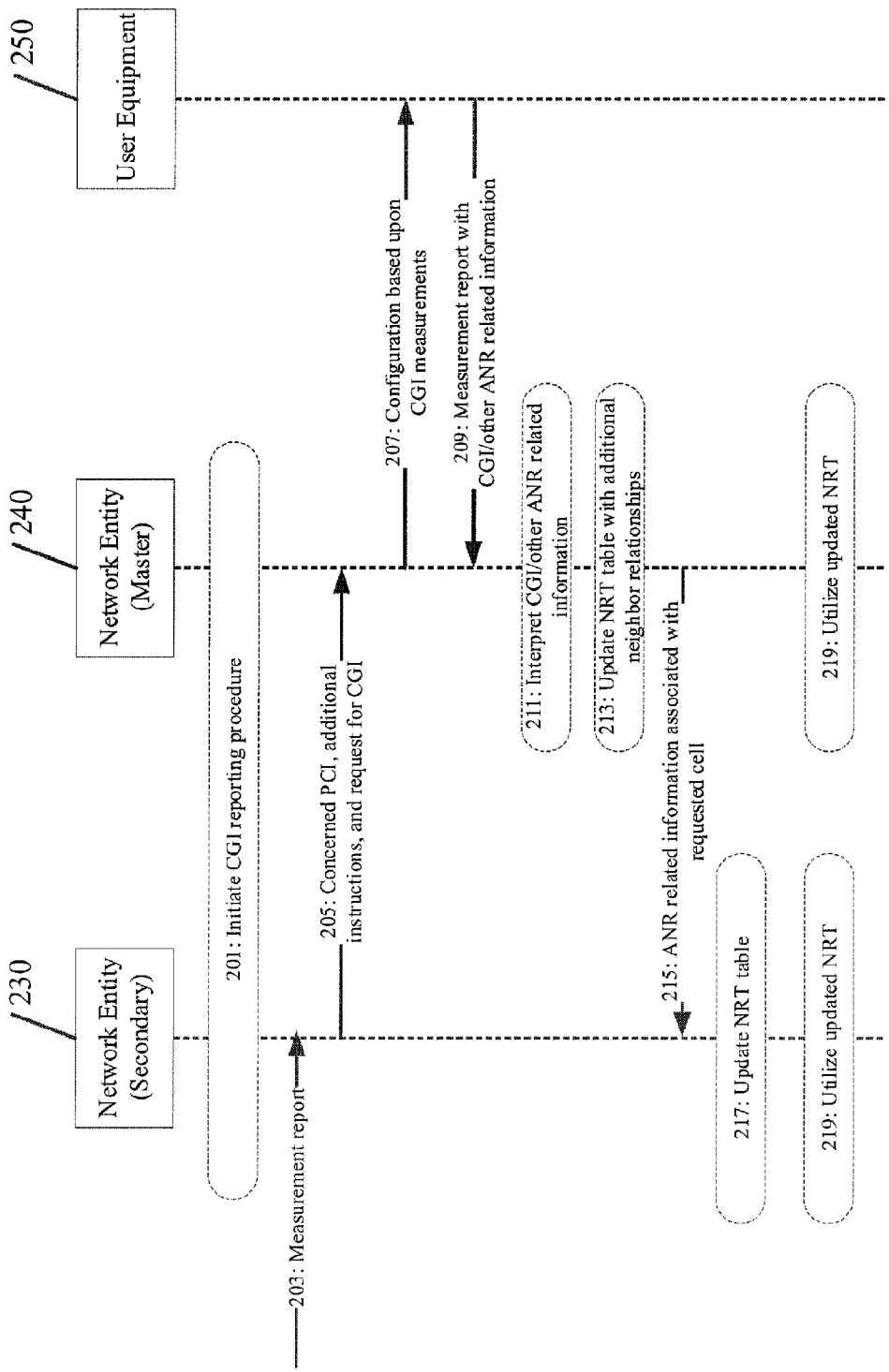
FIG. 2 illustrates an example of a signaling diagram according to certain embodiments.
Figure 5:
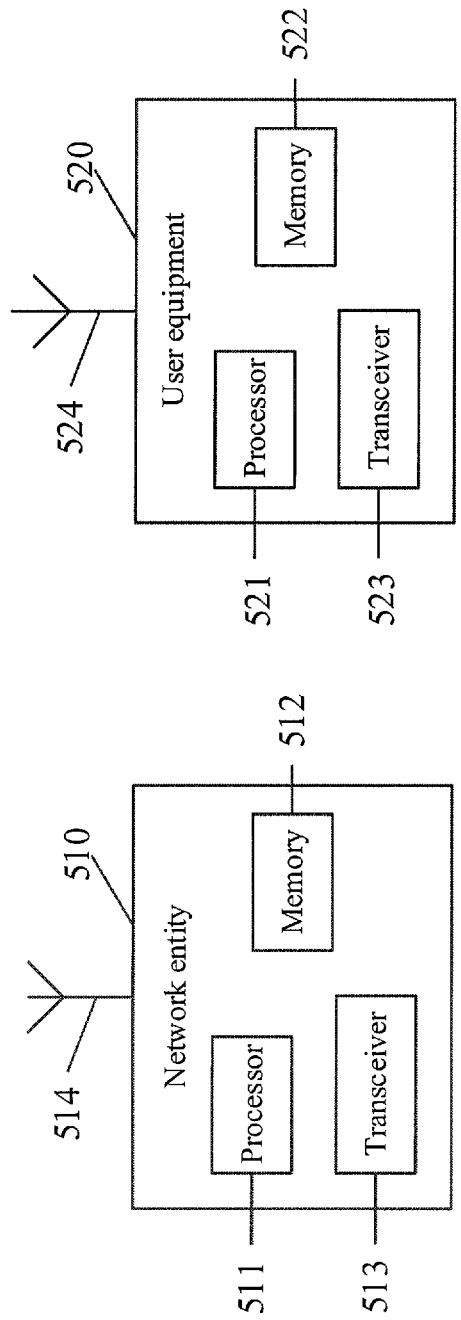
FIG. 5 illustrates an example of a system according to certain embodiments.

FIG. 2 illustrates an example of a signaling diagram showing communications between network entity 230, network entity 240, and user equipment 250. Network entity 230 and/or network entity 240 may be similar to network entity 510, as illustrated in FIG. 5. User equipment 250 may also be similar to user equipment 520, as illustrated in FIG. 5. The invention may be implemented by extending the currently existing messages between a master node and a secondary node, for example, by adding the CGI report request and response into CG-ConfigInfo and/or CG-Config messages. It could also use other inter node RRC messages or messages or Information Elements defined for $X_2$ or $X_n$ interfaces. In step 201, a CGI reporting procedure may be initiated. In some embodiments, network entity 230 may initiate the CGI reporting procedure. In other embodiments, network entity 240 may initiate the CGI reporting procedure. As an example, the network entity with the highest one or more reliability parameters may initiate the CGI reporting procedure. Alternatively or additionally, the initiating network entity may be associated with FR1 and/or FR2, and/or have the least network congestion.

In some embodiments, message CG-Config may be used to transfer the SCG radio configuration as generated by the SgNB. In some embodiments, message CG-Config may be described as follows:

Direction: Secondary gNB to master gNB or eNB.

CG-Config message
--ASN1START
--TAG-CG-CONFIG-START
CG-Config ::=        SEQUENCE {
    criticalExtensions    CHOICE {

| -continued |
|---|
| Direction: Secondary gNB to master gNB or eNB. |

```
    c1              CHOICE {
      cg-Config         CG-Config-IEs,
      spare3 NULL, spare2 NULL, spare1 NULL
    },
    criticalExtensionsFuture    SEQUENCE { }
  }
}
CG-Config-IEs ::=     SEQUENCE {
  scg-CellGroupConfig      OCTET STRING (CONTAINING RRCReconfiguration) OPTIONAL,
  scg-RB-Config        OCTET STRING (CONTAINING RadioBearerConfig) OPTIONAL,
  configRestrictModReq     ConfigRestrictModReqSCG     OPTIONAL,
  drx-InfoSCG       DRX-Info       OPTIONAL,
  candidateCellInfoListSN      OCTET STRING (CONTAININGMeasResultList2NR)OPTIONAL,
  measConfigSN        MeasConfigSN        OPTIONAL,
  selectedBandCombinationNR       BandCombinationIndex      OPTIONAL,
  fr-InfoListSCG       FR-InfoList       OPTIONAL,
  reportCGI-Request       SEQUENCE {
    ssbFrequency       ARFCN-ValueNR,
    smtc        SSB-MTC          OPTIONAL,
    cellForWhichToReportCGI     INTEGER (1..1007)
  }
  measResultReportCGI      SEQUENCE {
    ssbFrequency       ARFCN-ValueNR,
    cellForWhichToReportCGI     INTEGER (1..1007),
    cgi-Info       CGI-Info
  } OPTIONAL,
  nonCriticalExtension       SEQUENCE{ }          OPTIONAL
}
MeasConfigSN ::= SEQUENCE {
  measuredFrequenciesSN     SEQUENCE (SIZE (1.. maxMeasFreqsSN)) OF NR-FreqInfo OPTIONAL,
  ...
}
NR-FreqInfo ::= SEQUENCE {
  measuredFrequency       ARFCN-ValueNR       OPTIONAL,
  ...
}
ConfigRestrictModReqSCG .:=     SEQUENCE {
  requestedBC-MRDC       BandCombinationIndex       OPTIONAL,
  requestedP-MaxFR1      P-Max           OPTIONAL,
  ...
}
BandCombinationIndex ::= INTEGER (1..maxBandComb)
FR-InfoList ::= SEQUENCE (SIZE ( 1..maxNrofServingCells-1)) OF FR-Info
FR-Info ::= SEQUENCE {
  servCellIndex ServCellIndex,
  fr-Type      ENUMERATED {fr1, fr2}
}
--TAG-CG-CONFIG-STOP
--ASN1STOP
```

45

| CG-Con fig field descriptions |
|---| candidateCellInfoListSN
Contains information regarding cells that the source secondary node suggests the target secondary
gNB to consider configuring.
fr-InfoListSCG
Contains information of FR information of serving cells.
measuredFrequenciesSN
Used by SN to indicate a list of frequencies measured by the UE.
measResultReportCGI
Used by SN to provide MN with CGI-Info for the cell for which MN requested SN to perform reportCGI
procedure.
reportCGI-Request
Used by SN to request MN to perform reportCGI procedure for the indicated cell.
requestedP-MaxFR1
IRequested value for the maximum power for FR1 (see TS 38.104 [12]) the UE can use in NR SCG.
requestedBC-MRDC
Used to request configuring an NR band combination which is forbidden to use by MN. Each entry
refers to a band combination numbered according to supportedBandCombination in the
UE-MRDC-Capability.
Used to request configuring a list of NR baseband processing combinations which is forbidden to use
by MN. Each entry refers a NR baseband processing combination numbered according to

| CG-Config field descriptions |
| --- |
| supportedBasebandProcessingCombination in the UE-NR-Capability.<br>scg-CellGroupConfig<br>Contains the RRCReconfiguration message, used to (re-)configure the SCG configuration upon<br>SCG establishment or modification, as generated (entirely) by the (target) SgNB<br>scg-RB-Config<br>Contains the IE RadioBearerConfig, used to establish or reconfigure the SCG configuration, used to<br>(re-)configure the SCG RB configuration upon SCG establishment or modification, as generated<br>(entirely) by the (target) SgNB<br>selectedBandCombinationNR<br>Indicates the band combination selected by SN for the EN-DC.<br>configRestrictModReq<br>Used by SN to request changes to SCG configuration restrictions previously set by MN to ensure UE<br>capabilities are respected. E.g. can used to request configuring an NR band combination whose use MN has<br>previously forbidden. |

In some embodiments, message CG-ConfigInfo may be used by master eNB or gNB to request the SgNB to perform certain actions e.g. to establish, modify or release an SCG. The message may include additional information e.g. to assist the SgNB to set the SCG configuration. It can also be used by a CU to request a DU to perform certain actions, e.g. to establish, modify or release an MCG or SCG. In some embodiments, message CG-ConfigInfo may be described as follows:

| Direction: Master eNB or gNB to secondary gNB, alternatively CU to DU. |
| --- |
| CG-ConfigInfo message<br>--ASN1START<br>--TAG-CG-CONFIG-INFO-START<br>CG-ConfigInfo ::=     SEQUENCE {<br>  criticalExtensions   CHOICE {<br>    c1            CHOICE {<br>      cg-ConfigInfo    CG-ConfigInfo-IEs,<br>      spare3 NULL, spare2 NULL, spare1 NULL<br>    },<br>    criticalExtensionsFuture   SEQUENCE { }<br>  }<br>}<br>CG-ConfigInfo-IEs ::=    SEQUENCE {<br>    ue-CapabilityInfo      OCTET STRING (CONTAINING UE-CapabilityRAT-ContainerList)     OPTIONAL,-- Cond SN-Addition<br>    candidateCellInfoListMN     MeasResultList2NR     OPTIONAL,<br>    candidateCellInfoListSN     OCTET STRING (CONTAINING MeasResultList2NR)     OPTIONAL,<br>    measResultCellListSFTD     MeasResultCellListSFTD     OPTIONAL,<br>    scgFailureInfo     SEQUENCE {<br>      failureType     ENUMERATED { t310-Expiry, randomAccessProblem,<br>                      rlc-MaxNumRetx, scg-ChangeFailure,<br>                      scg-reconfigFailure,<br>                      srb3-IntegrityFailure},<br>      measResultSCG     OCTET STRING (CONTAINING MeasResultSCG-Failure)<br>    } OPTIONAL,<br>    configRestrictInfo     ConfigRestrictInfoSCG     OPTIONAL,<br>    drx-InfoMCG        DRX-Info     OPTIONAL,<br>    measConfigMN     MeasConfigMN     OPTIONAL,<br>    sourceConfigSCG     OCTET STRING (CONTAINING RRCReconfiguration)     OPTIONAL,<br>    scg-RB-Config     OCTET STRING (CONTAINING RadioBearerConfig)     OPTIONAL,<br>    mcg-RB-Config     OCTET STRING (CONTAINING RadioBearerConfig)     OPTIONAL,<br>    reportCGI-Request     SEQUENCE {<br>      ssbFrequency     ARFCN-ValueNR,<br>      smtc     SSB-MTC     OPTIONAL,<br>      cellForWhichToReportCGI     INTEGER (1..01007)<br>    }     OPTIONAL,<br>    measResultReportCGI     SEQUENCE {<br>      ssbFrequency     ARFCN-ValueNR,<br>      cellForWhichToReportCGI     INTEGER (1..1007),<br>      cgi-Info     CGI-Info<br>    }     OPTIONAL,<br>    nonCriticalExtension     SEQUENCE { }     OPTIONAL<br>}<br>ConfigRestrictInfoSCG ::=     SEQUENCE {<br>    allowedBC-ListMRDC     BandCombinationIndex List     OPTIONAL,<br>    powerCoordination-FR1     SEQUENCE {<br>      p-maxNR     P-Max     OPTIONAL,<br>      p-maxEUTRA     P-Max     OPTIONAL<br>    }     OPTIONAL,<br>    servCellIndexRangeSCG     SEQUENCE { |

| Direction: Master eNB or gNB to secondary gNB, alternatively CU to DU. |
|---|

```
    lowBound          ServCellIndex,
    upBound           ServCellIndex
  }                                   OPTIONAL, -- Cond SN-Addition
  maxMeasFreqsSCG-NR        INTEGER(1..max MeasFreqsMN)     OPTIONAL,
  maxMeasIdentitiesSCG-NR   INTEGER(1.. maxMeasIdentitiesMN) OPTIONAL,
  reportCGI-ResponsibleNode ENUMERATED {mn, sn}             OPTIONAL,-- Cond SN-Addition
  ...
}
BandCombinationIndexList ::= SEQUENCE (SIZE (1..maxBandComb)) OF BandCombinationIndex
DRX-Info ::=           SEQUENCE {
  drx-LongCycleStartOffset    CHOICE {
    ms10           INTEGER(0..9),
    ms20           INTEGER(0..19),
    ms32           INTEGER(0..31),
    ms40           INTEGER(0..39),
    ms60           INTEGER(0..59),
    ms64           INTEGER(0..63),
    ms70           INTEGER(0..69),
    ms80           INTEGER(0..79),
    ms128            INTEGER(0..127),
    ms160            INTEGER(0..159),
    ms256            INTEGER(0..255),
    ms320            INTEGER(0..319),
    ms512            INTEGER(0..511),
    ms640            INTEGER(0..639),
    ms1024            INTEGER(0..1023),
    ms1280            INTEGER(0..1279),
    ms2048            INTEGER(0..2047),
    ms2560            INTEGER(0..2559),
    ms5120            INTEGER(0..5119),
    ms10240            INTEGER(0..10239)
  },
  shortDRX        SEQUENCE (
    drx-ShortCycle     ENUMERATED {
                     ms2, ms3, ms4, ms5, ms6, ms7, ms8, ms10, ms14, ms16, ms20, ms30, ms32,
                     ms35, ms40, ms64, ms80, ms128, ms160, ms256, ms320, ms512, ms640, spare9,
                     spare8, spare7, spare6, spare5, spare4, spare3, spare2, spare1 },
    drx-ShortCycleTimer    INTEGER (1..16)
  }                                  OPTIONAL
}
MeasConfigMN ::= SEQUENCE {
  measuredFrequenciesMN        SEQUENCE (SIZE (1..maxMeasFreqsMN)) OF NR-FreqInfo OPTIONAL,
  measGapConfig         SetupRelease { GapConfig }      OPTIONAL,
  gapPurpose            ENUMERATED {perUE, perFR1}      OPTIONAL,
  ...
}
--TAG-CG-CONFIG-INFO-STOP
--ASN1STOP
```

| CG-ConfigInfo field descriptions |
|---| allowedBandCombinationListMRDC
A list of indices referring to band combinations in MR-DC capabilities from which SN is allowed to select an NR
band combination. Each entry refers to a band combination numbered according to supportedBandCombination in
the UE-MRDC-Capability. All MR-DC band combinations indicated by this field comprise the same LTE band
combination.
Indicates
candidateCellInfoListMN, candidateCellInfoListSN
Contains information regarding cells that the master node or the source node suggests the target gNB to consider
configuring.
Including CSI-RS measurement results in candidateCellInfoListMN is not supported in this version of the
specification.
maxMeasFreqsSCG-NR
Indicates the maximum number of NR inter-frequency carriers the SN is allowed to configure with PSCell for
measurements.
maxMeasIdentitiesSCG-NR
Indicates the maximum number of allowed measurement identities that the SCG is allowed to configure.
measuredFrequenciesMN
Used by MN to indicate a list of frequencies measured by the UE.
measGapConfig
Indicates the measurement gap configuration configured by MN.
measResultReportCGI

| CG-ConfigInfo field descriptions |
|---|
| Used by MN to provide SN with CGI-Info for the cell for which SN requested MN to perform reportCGI procedure. |
| mcg-RB-Config |
| Contains the IE RadioBearerConfig of the MN, used to support delta configuration for bearer type change between MN terminated to SN terminated bearer and SN change. |
| p-maxEUTRA |
| Indicates the maximum power for EUTRA (see TS 36.104 [XX]) the UE can use in LTE MCG. |
| p-maxNR |
| Indicates the maximum power for NR (see TS 38.104 [12]) the UE can use in NR SCG. |
| powerCoordination-FR1 |
| Indicates the maximum power that the UE can use in FR1. |
| scg-RB-Config |
| Contains the IE RadioBearerConfig of the SN, used to support delta configuration e.g. during SN change. This field is absent when master eNB uses full configuration option. |
| sourceConfigSCG |
| Includes the current dedicated SCG configuration in the same format as the RRCReconfiguration message, i.e. not only CellGroupConfig but also e.g. measConfig. This field is absent when master eNB uses full configuration option. |
| ConfigRestrictInfo |
| Includes fields for which SgNB is explictly indicated to observe a configuration restriction. |
| reportCGI-Request |
| Used by MN to request SN to perform reportCGI procedure for the indicated cell. |
| reportCGI-ResponsibleNode |
| Indicates the node responsible for providing reportCGI configurations to the UE and executing reportCGI procedure. |
| servCellIndexRangeSCG |
| Range of serving cell indices that SN is allowed to configure for SCG serving cells. |

In some embodiments, additional information may be sent together with the reportCGI request, for example, frequency/ARFCN of the SSB, SMTC, and/or PCI of the cell for which report CGI is to be performed.

In some embodiments, information may be sent back to the requesting node, for example, PCI of the cell, frequency/ARFCN of the SSB, CI-Info including list of PLMNs, TACs, Cell Identities, and/or RANAC.

In some embodiments, network entity 240 may determine which of network entity 230 and network entity 240 should initiate the CGI reporting procedure. For example, network entity 240 may send network entity 230 an indication that network entity 240 will initiate the CGI reporting procedure, and that network entity 230 must request CGI reporting data from network entity 240. As another example, network entity 240 may send network entity 230 an indication that network entity 240 will initiate the CGI reporting procedure, that no further coordination is required in case network entity 230 would like to run the reportCGI procedure itself, and/or that network entity 230 should determine if network entity 240 has requested CGI reporting data.

In step 203, network entity 230 may receive one or more measurement reports. In step 205, network entity 230 may transmit a request for a cell global identity, at least one concerned physical cell identifier (PCI), and/or additional instructions to network entity 240.

In step 207, network entity 240 may perform a configuration with user equipment 250 using one or more cell global identity measurement report configurations with parameters obtained in step 205. In step 209, network entity 240 may receive one or more measurement reports with one or more cell global identities and/or other automatic neighbor relation related information from user equipment 250. In step 211, network entity 240 may interpret the one or more received cell global identities and/or other received automatic neighbor relation related information. In step 213, network entity 240 may update one or more neighbor relation tables with additional neighbor relationships. In step 215, network entity 240 may transmit automatic network relation related information associated with the requested cell. In step 217, network entity 230 may update one or more network relation tables. In step 219, network entity 230 may transmit data according to one or more of the one or more updated network relation tables.

Figure 3:
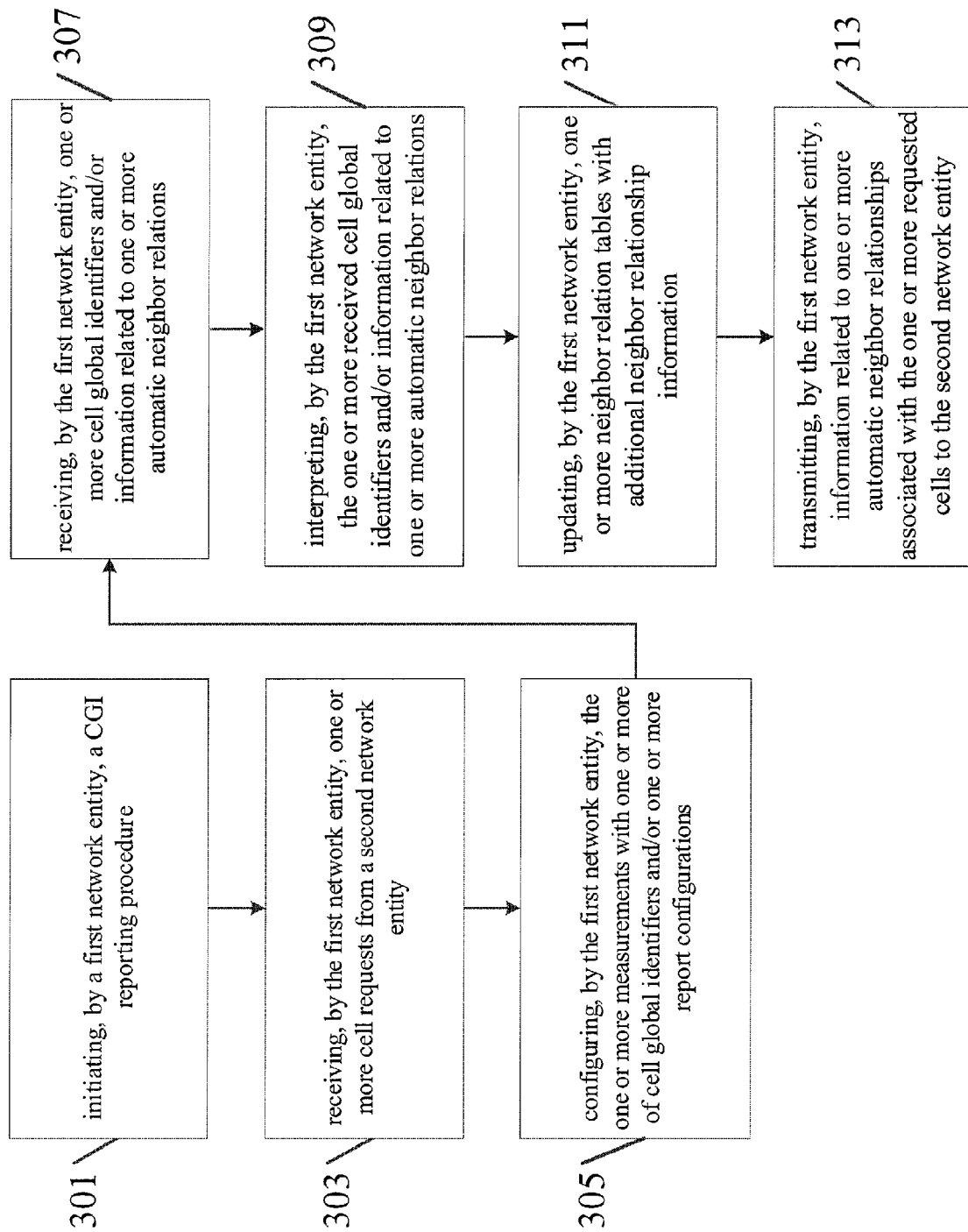
FIG. 3 illustrates an example of a method performed by a network entity according to certain embodiments.

FIG. 3 illustrates an example method performed by a network entity, similar to network entity 510 that is illustrated in FIG. 5. In step 301, a first network entity may initiate a CGI reporting procedure. In some embodiments, the first network entity may send a second network entity, also similar to network entity 510 in FIG. 5, an indication that the first network entity will initiate the CGI reporting procedure, and that the second network entity must request CGI reporting data from the first network entity.

In step 303, the first network entity may receive one or more cell requests from the second network entity. In step 305, the first network entity may configure one or more measurements with one or more of cell global identifiers and/or one or more report configurations. In step 307, the first network entity may receive one or more cell global identifiers and/or information related to one or more automatic neighbor relations. In step 309, the first network entity may interpret the one or more received cell global identifiers and/or information related to one or more automatic neighbor relations. In step 311, the first network entity may update one or more neighbor relation tables with additional neighbor relationship information. In step 313, the first network entity may transmit information related to one or more automatic neighbor relationships associated with the one or more requested cells to the second network entity.

Figure 4:
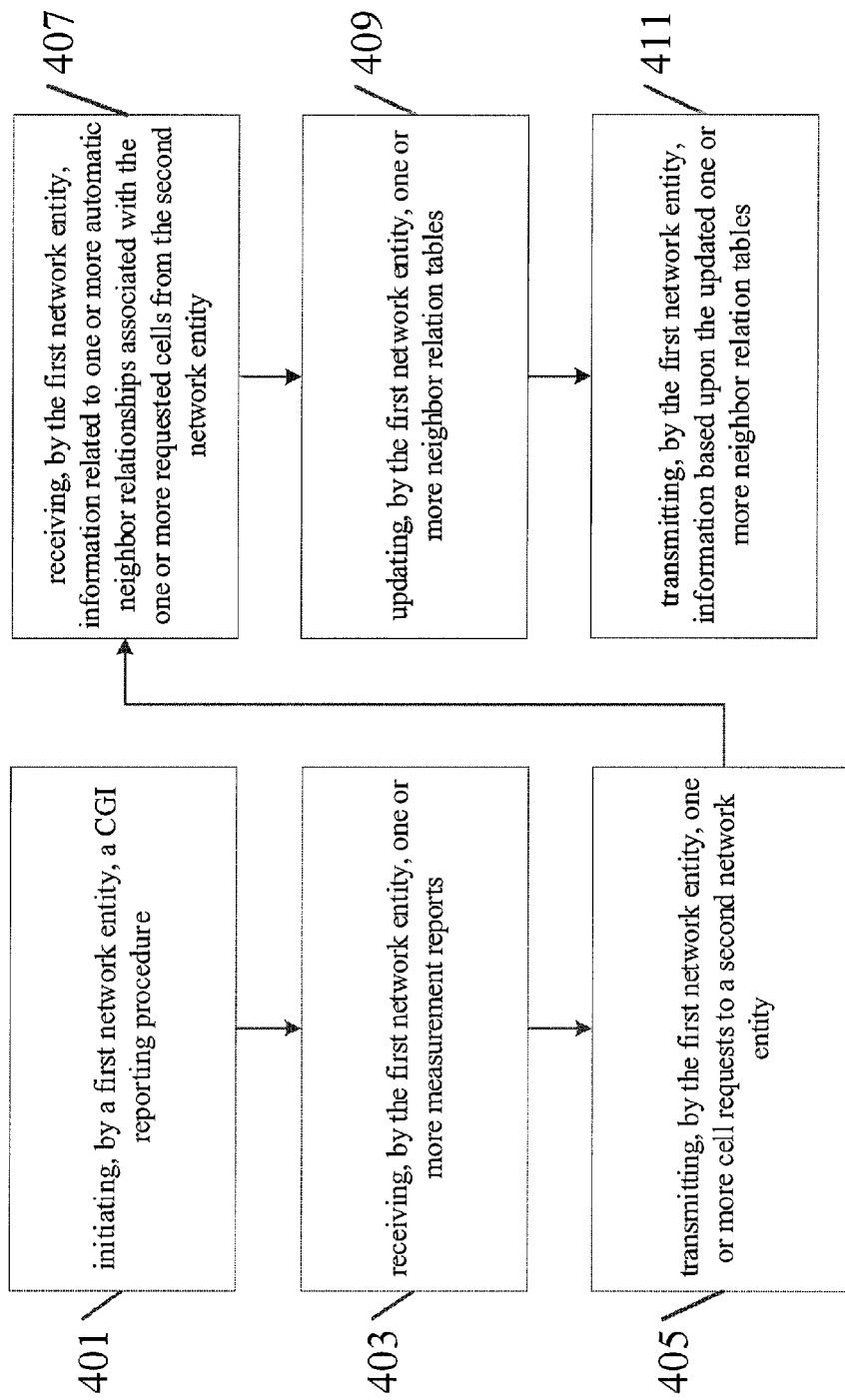
FIG. 4 illustrates an example of another method performed by a network entity according to certain embodiments.

FIG. 4 illustrates another example method performed by a network entity. In step 401, a first network entity, similar to network entity 510 that is illustrated in FIG. 5, may initiate a CGI reporting procedure. In some embodiments, the first network entity may be associated with the highest one or more reliability parameters, with FR1 and/or FR2, and/or have the least network congestion.

In some embodiments, the first network may receive an indication from a second network entity, also similar to network entity 510 that is illustrated in FIG. 5, that the first network entity will initiate the CGI reporting procedure, that no further coordination is required in case the first network entity would like to run the reportCGI procedure itself, and/or that the first network entity should determine if the second network entity has requested CGI reporting data.

In step 403, the first network entity may receive one or more measurement reports. In step 405, the first network entity may transmit one or more cell requests to the second network entity. In step 407, the first network entity may receive information related to the one or more automatic neighbor relationships associated with the one or more requested cells from the second network entity. In step 409, the first network entity may update one or more neighbor relation tables. In step 411, the first network entity may transmit information based upon the updated one or more neighbor relation tables.

FIG. 5 illustrates an example of a system according to certain embodiments. In one embodiment, a system may include multiple devices, such as, for example, network entity 510 and/or user equipment 520.

Network entity 510 may be one or more of a base station, such as an evolved node B (eNB) or 5G or New Radio node B (gNB), a serving gateway, a server, and/or any other access node or combination thereof.

User equipment 520 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof. Furthermore, network entity 510 and/or user equipment 520 may be one or more of a citizens broadband radio service device (CBSD).

One or more of these devices may include at least one processor, respectively indicated as 511 and 521. Processors 511 and 521 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of devices indicated at 512 and 522. The memory may be fixed or removable. The memory may include computer program instructions or computer code contained therein. Memories 512 and 522 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language. Memory may be removable or non-removable.

Processors 511 and 521 and memories 512 and 522 or a subset thereof, may be configured to provide means corresponding to the various blocks of FIGS. 1-4. Although not shown, the devices may also include positioning hardware, such as GPS or micro electrical mechanical system (MEMS) hardware, which may be used to determine a location of the device. Other sensors are also permitted and may be included to determine location, elevation, orientation, and so forth, such as barometers, compasses, and the like.

As shown in FIG. 5, transceivers 513 and 523 may be provided, and one or more devices may also include at least one antenna, respectively illustrated as 514 and 524. The device may have many antennas, such as an array of antennas configured for multiple input multiple output (MIMO) communications, or multiple antennas for multiple radio access technologies. Other configurations of these devices, for example, may be provided. Transceivers 513 and 523 may be a transmitter, a receiver, or both a transmitter and a receiver, or a unit or device that may be configured both for transmission and reception.

The memory and the computer program instructions may be configured, with the processor for the particular device, to cause a hardware apparatus such as user equipment to perform any of the processes described below (see, for example, FIGS. 1-4). Therefore, in certain embodiments, a non-transitory computer-readable medium may be encoded with computer instructions that, when executed in hardware, perform a process such as one of the processes described herein. Alternatively, certain embodiments may be performed entirely in hardware.

In certain embodiments, an apparatus may include circuitry configured to perform any of the processes or functions illustrated in FIGS. 1-4. For example, circuitry may be hardware-only circuit implementations, such as analog and/or digital circuitry. In another example, circuitry may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that certain embodiments discussed above may be practiced with steps in a different order, and/or with hardware elements in configurations which are different than those which are disclosed. Therefore, it would be apparent to those of skill in the art that certain modifications, variations, and alternative constructions would be apparent, while remaining within the spirit and scope of the invention. In order to determine the metes and bounds of the invention, therefore, reference should be made to the appended claims.

Partial Glossary

3GPP 3rd Generation Partnership Project
5G 5th Generation Wireless System

ANR Automatic Neighbor Relations
ARFCN Absolute radio-frequency channel number
CGI Cell Global Identity
eNB evolved Node B
EN-DC E-UTRAN and NR Dual Connectivity
E-UTRAN Evolved Universal Mobile Telecommunications System Terrestrial Radio Access Network
FR 1/2 Frequency Range 1/2
gNB Next Generation Node B
LTE Long Term Evolution
MN Master Node
MR-DC Multi-RAT Dual Connectivity
NCGI New Radio Cell Global Identity
NCR Neighbor Cell Relations
NR New Radio
NR-DC New Radio Dual Connectivity
NRT Neighbor Relation Table
PCI Physical Cell Identity
PLMN Public Land Mobile Network
RA Radio Access
RAN Radio Access Network
RANAC Radio Access Network Area Code
RRC Radio Resource Control
SMTC SSB Measurement Timing Configuration
SN Secondary Node
SSB Synchronization Signal Block
TAC Tracking Area Code
UE User Equipment

What is claimed is:

1. An apparatus, comprising:
at least one processor; and
at least one memory including computer program code,
wherein the at least one memory and the computer program code are configured to, with the at least one processor, cause the apparatus to:
initiate a cell global identity reporting procedure based upon one or more reliability parameters;
transmit a request for one or more cell global identities associated with one or more cells to a network entity, wherein the apparatus comprises a secondary node, and the network entity comprises a master node to a user equipment operating in dual connectivity mode;
receive neighbor relation related information associated with the one or more cells; and
update one or more neighbor relation tables based upon the received neighbor relation related information.

2. The apparatus according to claim 1, wherein at least one entry is missing from an apparatus's neighbor relation table for the one or more cells.

3. The apparatus according to claim 1, wherein the at least one memory and the computer program code are further configured to, with the at least one processor, cause the apparatus to:
receive at least one measurement report with a cell global identity for which no neighbor relation table entry exists.

4. The apparatus according to claim 1, wherein the at least one memory and the computer program code are further configured to, with the at least one processor, cause the apparatus to:
transmit information based upon the updated one or more neighbor relation tables.

5. The apparatus according to claim 1, wherein the at least one memory and the computer program code are further configured to, with the at least one processor, cause the apparatus to:
receive an indication from the network entity about which network entity is responsible for running cell global identity measurement report configurations.

6. A method, comprising:
initiating, by a first network entity, a cell global identity reporting procedure based upon one or more reliability parameters;
transmitting, by the first network entity, a request for one or more cell global identities associated with one or more cells to a second network entity, wherein the first network entity comprises a secondary node, and the second network entity comprises a master node to a user equipment operating in dual connectivity mode;
receiving, by the first network entity, neighbor relation related information associated with the one or more cells; and
updating, by the first network entity, one or more neighbor relation tables based upon the received neighbor relation related information.

7. The method according to claim 6, wherein at least one entry is missing from a neighbor relation table of the first network entity for the one or more cells.

8. The method according to claim 6, further comprising:
receiving, by the first network entity, one or more measurement reports.

9. The method according to claim 6, further comprising:
transmitting, by the first network entity, information based upon the updated one or more neighbor relation tables.

10. An apparatus, comprising:
at least one processor; and
at least one memory including computer program code,
wherein the at least one memory and the computer program code are configured to, with the at least one processor, cause the apparatus to:
initiate a cell global identity reporting procedure based upon one or more reliability parameters;
receive a request for one or more cell global identities associated with one or more cells from a network entity, wherein the apparatus comprises a master node, and the network entity comprises a secondary node to a user equipment operating in dual connectivity mode;
update one or more neighbor relation tables with additional neighbor relations; and
transmit neighbor relation related information associated with the one or more cells to the network entity.

11. The apparatus according to claim 10, wherein the at least one memory and the computer program code are further configured to, with the at least one processor, cause the apparatus to:
perform a configuration using one or more cell global identity measurement report configurations.

12. The apparatus according to claim 10, wherein the at least one memory and the computer program code are further configured to, with the at least one processor, cause the apparatus to:
receive one or more measurement reports with one or more cell global identities and/or other neighbor relation related information.

13. The apparatus according to claim 10, wherein the at least one memory and the computer program code are further configured to, with the at least one processor, cause the apparatus to:
interpret the one or more received cell global identities and/or other received neighbor relation related information.

14. The apparatus according to claim 10, wherein the at least one memory and the computer program code are further configured to, with the at least one processor, cause the apparatus to:
  transmit an indication to the second network entity about which network entity is responsible for running cell global identity measurement report configurations.

* * * * *